J. LANGRALL.
Oyster-Feeder.

No. 221,326. Patented Nov. 4, 1879.

WITNESSES

INVENTOR
James Langrall
by E. W. Anderson
his ATTORNEY

UNITED STATES PATENT OFFICE.

JAMES LANGRALL, OF BALTIMORE, MARYLAND.

IMPROVEMENT IN OYSTER-FEEDERS.

Specification forming part of Letters Patent No. 221,326, dated November 4, 1879; application filed July 26, 1879.

*To all whom it may concern:*

Be it known that I, JAMES LANGRALL, of Baltimore, in the county of Baltimore and State of Maryland, have invented a new and valuable Improvement in Oyster-Feeders; and I do hereby declare that the following is a full, clear, and exact description of the construction and operation of the same, reference being had to the annexed drawings, making a part of this specification, and to the letters and figures of reference marked thereon.

Figure 1:
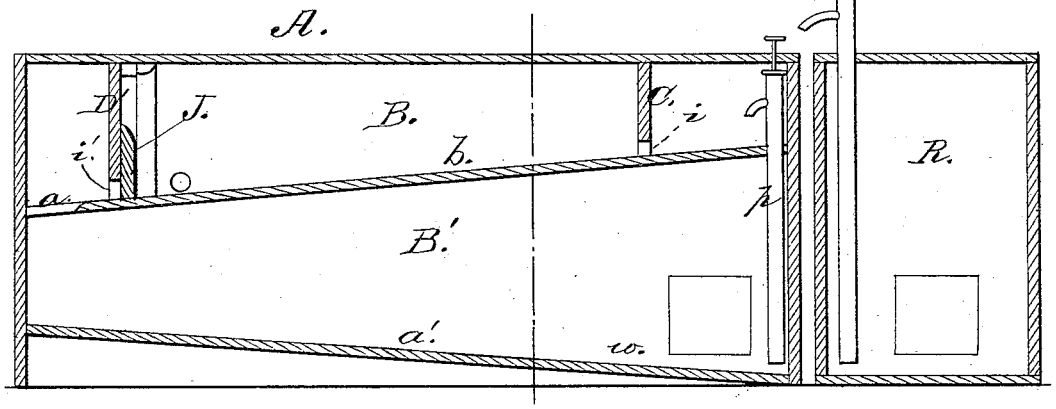
Figure 2:
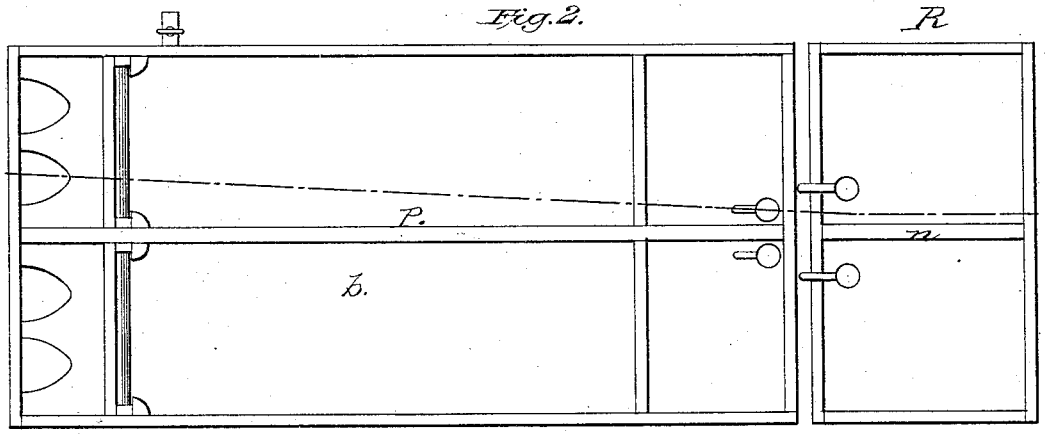
Figure 3:
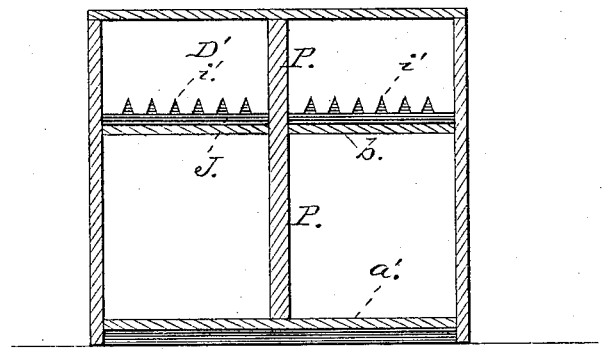

Figure 1 of the drawings is a representation of a longitudinal section of my oyster-feeder. Fig. 2 is a top view of the same, and Fig. 3 is a transverse section thereof.

This invention has relation to improvements in devices for feeding oysters; and it has for its object to provide an apparatus in which the oysters may be placed and supplied, in quantities as desired, with sea-water containing the natural food of the oyster, or with fresh water; and the nature of the invention consists in an oyster-feeder composed of two superimposed tanks having oppositely-inclined bottoms, openings in the bottom of the upper tank leading into the lower one, and a pump or pumps raising water from the lower tank and discharging it into the upper one.

It also consists in the combination, with an oyster-feeder having oppositely-inclined bottoms and openings in the upper bottom, of the division-walls C, having perforations $i'$ in their lower edge for the purpose of distributing the water, as hereinafter shown and described.

In the annexed drawings, the letter A designates the feeder, consisting, essentially, of a tank, B, having an inclined bottom, $b$, through which, at its lower end, are made openings $a$, leading into a second tank, B', whereof the bottom $a'$ is inclined oppositely from the bottom $b$ of the upper tank, so that the fresh or brackish water falling through openings $a$ at the lower end of tank B will be conducted by bottom $a'$ into a well, $w$, at the lower end of said bottom, whence it is raised by pumps $p$ continuously and redischarged upon the oysters in the upper tank. Usually, both tanks are divided longitudinally by partitions P into two divisions for the purpose of using fresh water in one part and salt or brackish water in the other.

In order to secure a proper distribution of the water in the tank B, a division-wall, C, having perforations $i'$ in its lower edge, is carried across the upper end of the same near the pumps $p$, through which the water is spread over the entire width of the tank and fed to every oyster therein; and in order to prevent this water from running off too fast, a division-wall, D, is carried across the lower end of the tank B, having perforations $i'$ in its lower edge, which may be entirely or partially closed at pleasure by means of slides J, sashed in the sides of the tank, or by means of other equivalent devices.

As shown in Fig. 2, the tanks are arranged in pairs, one side being for fresh water and the other for salt or brackish water, and when such are attainable from natural sources the waters will be delivered directly into the tanks; but this not being always feasible, I substitute therefor a reservoir, R, divided by a vertical partition, $n$, into two compartments, one for fresh and the other for salt water. When the latter cannot be had from natural sources, it may be made by the admixture with fresh water of sea-salt in proper proportions.

The tanks and reservoirs are made of any suitable materials and of any desired sizes, and they are designed to be fixed or portable. They may be set up in cars, steamers, warehouses, or in the open air, under sheds or other shelter, and in the feeding and fattening of oysters are effective in either situation.

What I claim as new, and desire to secure by Letters Patent, is—

1. The oyster-feeder consisting of the superposed tanks having oppositely-inclined bottoms, openings in the bottom of the upper tank, and pumps for raising water from the lower tank and discharging it into the upper one, substantially as specified.

2. In combination with the oyster-feeder having oppositely-inclined bottoms and openings in the upper bottom, the division-walls C, having perforations $i'$ in their lower edge for the purpose of distributing the water, substantially as specified.

In testimony that I claim the above I have hereunto subscribed my name in the presence of two witnesses.

JAMES LANGRALL.

Witnesses:
PHILIP C. MASI,
FRANK J. MASI.